(12) United States Patent
Gillette et al.

(10) Patent No.: US 11,921,373 B2
(45) Date of Patent: Mar. 5, 2024

(54) BACKLIGHT FOR DISPLAY

(71) Applicant: 3M INNOVATIVE PROPERTIES COMPANY, St. Paul, MN (US)

(72) Inventors: Kristy A. Gillette, Spring Valley, WI (US); Michelle L Toy, North St. Paul, MN (US); William Blake Kolb, Stillwater, MN (US); Jonah Shaver, Saint Paul, MN (US); Jason S. Petaja, Hudson, WI (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 0 days.

(21) Appl. No.: 17/797,480

(22) PCT Filed: Feb. 1, 2021

(86) PCT No.: PCT/IB2021/050786
§ 371 (c)(1),
(2) Date: Aug. 4, 2022

(87) PCT Pub. No.: WO2021/161128
PCT Pub. Date: Aug. 19, 2021

(65) Prior Publication Data
US 2023/0066094 A1 Mar. 2, 2023

Related U.S. Application Data

(60) Provisional application No. 62/972,186, filed on Feb. 10, 2020.

(51) Int. Cl.
*G02F 1/13357* (2006.01)
*G02F 1/1335* (2006.01)

(52) U.S. Cl.
CPC .. *G02F 1/133605* (2013.01); *G02F 1/133504* (2013.01); *G02F 1/133524* (2013.01);
(Continued)

(58) Field of Classification Search
CPC ......... G02F 1/133605; G02F 1/133504; G02F 1/133524; G02F 1/133533;
(Continued)

(56) References Cited

U.S. PATENT DOCUMENTS 5,882,774 A * 3/1999 Jonza ................... G02B 5/3083
428/522
6,570,710 B1 * 5/2003 Nilsen ...................... G02B 1/11
359/251
(Continued)

FOREIGN PATENT DOCUMENTS

GB 2468353 A * 9/2010 ........... G02B 6/0043
WO WO-2017214051 A1 * 12/2017 ....... G02F 1/133536
(Continued)

OTHER PUBLICATIONS

International Search Report for PCT International Application No. PCT/IB2021/050786, dated Mar. 30, 2021, 3 pages.

*Primary Examiner* — Donald L Raleigh
(74) *Attorney, Agent, or Firm* — Robert S. Moshrefzadeh

(57) ABSTRACT

A backlight includes an extended light source adapted to emit light. A reflective polarizer is disposed on the extended light source, such that for substantially normally incident light and for at least a first wavelength in a range from about 420 nanometer (nm) to about 650 nm, the reflective polarizer reflects at least 60% of the incident light having a first polarization state and transmits at least 60% of the incident light having an orthogonal second polarization state. A first prismatic film is disposed between the extended light source and the reflective polarizer. A retarder layer is disposed between the reflective polarizer and the first prismatic film, such that for substantially normally incident light at a wavelength of about 550 nm, the retarder layer has a
(Continued)

retardance nW, where n is an integer ≥1 and W is a wavelength between about 160 nm and about 300 nm.

16 Claims, 6 Drawing Sheets

(52) U.S. Cl.
 CPC .. *G02F 1/133533* (2013.01); *G02F 1/133536* (2013.01); *G02F 1/133607* (2021.01)
(58) Field of Classification Search
 CPC ......... G02F 1/133536; G02F 1/133607; G02F 1/133615; G02B 6/0056; G02B 6/0053; G02B 6/0068
 See application file for complete search history.

(56) References Cited

U.S. PATENT DOCUMENTS

| | | |
|---|---|---|
| 2006/0104088 A1 | 5/2006 | Gon et al. |
| 2015/0116833 A1 | 4/2015 | Boyd et al. |

FOREIGN PATENT DOCUMENTS

| | | | |
|---|---|---|---|
| WO | 2018226711 A1 | 12/2018 | |
| WO | WO-2018226711 A1 * | 12/2018 | ............... G02B 5/30 |

\* cited by examiner

BACKLIGHT FOR DISPLAY

CROSS REFERENCE TO RELATED APPLICATIONS

This application is a national stage filing under 35 U.S.C. 371 of PCT/IB2021/050786, filed Feb. 1, 2021, which claims the benefit of U.S. Application No. 62/972,186, filed Feb. 10, 2020, the disclosures of which are incorporated by reference in their entireties herein.

TECHNICAL FIELD

The present disclosure relates generally to a backlight, and in particular, to a backlight for a display.

BACKGROUND

A liquid crystal display (LCD) panel uses light-modulating properties of liquid crystals. The liquid crystals do not emit light directly and a backlight unit is used to produce images in color or monochrome. The backlight unit provides illumination to the LCD panel. The backlight unit generally includes one or more prism films and a reflective polarizer to maximize brightness in a direction normal to a screen (axial luminance). The combination of the reflective polarizer and the one or more prism films may lead to an optical artifact, referred to as Reflective Polarizer Reflective Moiré (RPRM). RPRM typically appears as alternating dark and bright bands that follow the contour of the prism films.

SUMMARY

In one aspect, there is provided a backlight for providing illumination to a liquid crystal panel. The backlight includes an extended light source, a reflective polarizer, a first prismatic film, and a retarder layer. The extended light source is adapted to emit light through an emission surface thereof. The reflective polarizer is disposed on the extended light source, such that for substantially normally incident light and for at least a first wavelength in a range from about 420 nanometer (nm) to about 650 nm, the reflective polarizer reflects at least 60% of the incident light having a first polarization state and transmits at least 60% of the incident light having an orthogonal second polarization state. The first prismatic film is disposed between the extended light source and the reflective polarizer and includes a structured major surface. The structured major surface includes a plurality of substantially parallel first linear prisms extending along a first direction and arranged in an orthogonal second direction. The retarder layer is disposed between the reflective polarizer and the first prismatic film, such that for substantially normally incident light at a wavelength of about 550 nm, the retarder layer has a retardance nW, where n is an integer ≥1 and W is a wavelength between about 160 nm and about 300 nm.

In another aspect, there is provided a backlight for providing illumination to a liquid crystal panel. The backlight includes an extended light source, a reflective polarizer, a first prismatic film, and an achromatic retarder layer. The extended light source is adapted to emit light through an emission surface thereof. The reflective polarizer is disposed on the extended light source, such that for substantially normally incident light and for at least a first wavelength in a range from about 420 nm to about 650 nm, the reflective polarizer reflects at least 60% of the incident light having a first polarization state and transmits at least 60% of the incident light having an orthogonal second polarization state. The first prismatic film is disposed between the extended light source and the reflective polarizer and includes a structured major surface. The structured major surface includes a plurality of substantially parallel first linear prisms extending along a first direction and arranged in an orthogonal second direction. The achromatic retarder layer is disposed between the reflective polarizer and the first prismatic film, such that for substantially normally incident light, the retarder layer has a minimum blue retardance at a corresponding blue wavelength, a minimum green retardance at a corresponding green wavelength, and a minimum red retardance at a corresponding red wavelength. The minimum blue, green and red retardances are within 20% of each other.

BRIEF DESCRIPTION OF THE DRAWINGS

Exemplary embodiments disclosed herein may be more completely understood in consideration of the following detailed description in connection with the following figures. The figures are not necessarily drawn to scale. Like numbers used in the figures refer to like components. However, it will be understood that the use of a number to refer to a component in a given figure is not intended to limit the component in another figure labeled with the same number.

DETAILED DESCRIPTION

In the following description, reference is made to the accompanying figures that form a part thereof and in which various embodiments are shown by way of illustration. It is to be understood that other embodiments are contemplated and may be made without departing from the scope or spirit of the present disclosure. The following detailed description, therefore, is not to be taken in a limiting sense.

The present disclosure relates to a backlight for providing illumination to a liquid crystal panel. The backlight may be used in electronic devices that incorporate liquid crystal displays (LCDs), such as computer monitors, televisions, mobile phones, personal digital assistants (PDAs), wearable devices and other portable devices. The backlight includes an extended light source, a reflective polarizer, a first prismatic film and a retarder layer. The extended light source is adapted to emit light through an emission surface. The retarder layer is disposed between the reflective polarizer and the first prismatic film. The retarder layer has a retardance nW for substantially normally incident light at a wavelength of about 550 nm, where n is an integer ≥1 and W is a wavelength between about 160 nm and about 300 nm.

The retarder layer may provide tuned retardance to light reflected from the reflective polarizer. Tuned retardance provided by the retarder layer may mitigate an optical artifact that is otherwise caused due to the combination of the reflective polarizer and one or more prism films. This optical artifact is referred to as Reflective Polarizer Reflective Moiré (RPRM). In some embodiments, the retarder layer is an achromatic retarder layer having minimal variation of retardance with wavelength. The achromatic retarder layer may minimize angular variation of color coordinates x and y in CIE 1931 chromaticity coordinate system in a white region.

Figure 1:
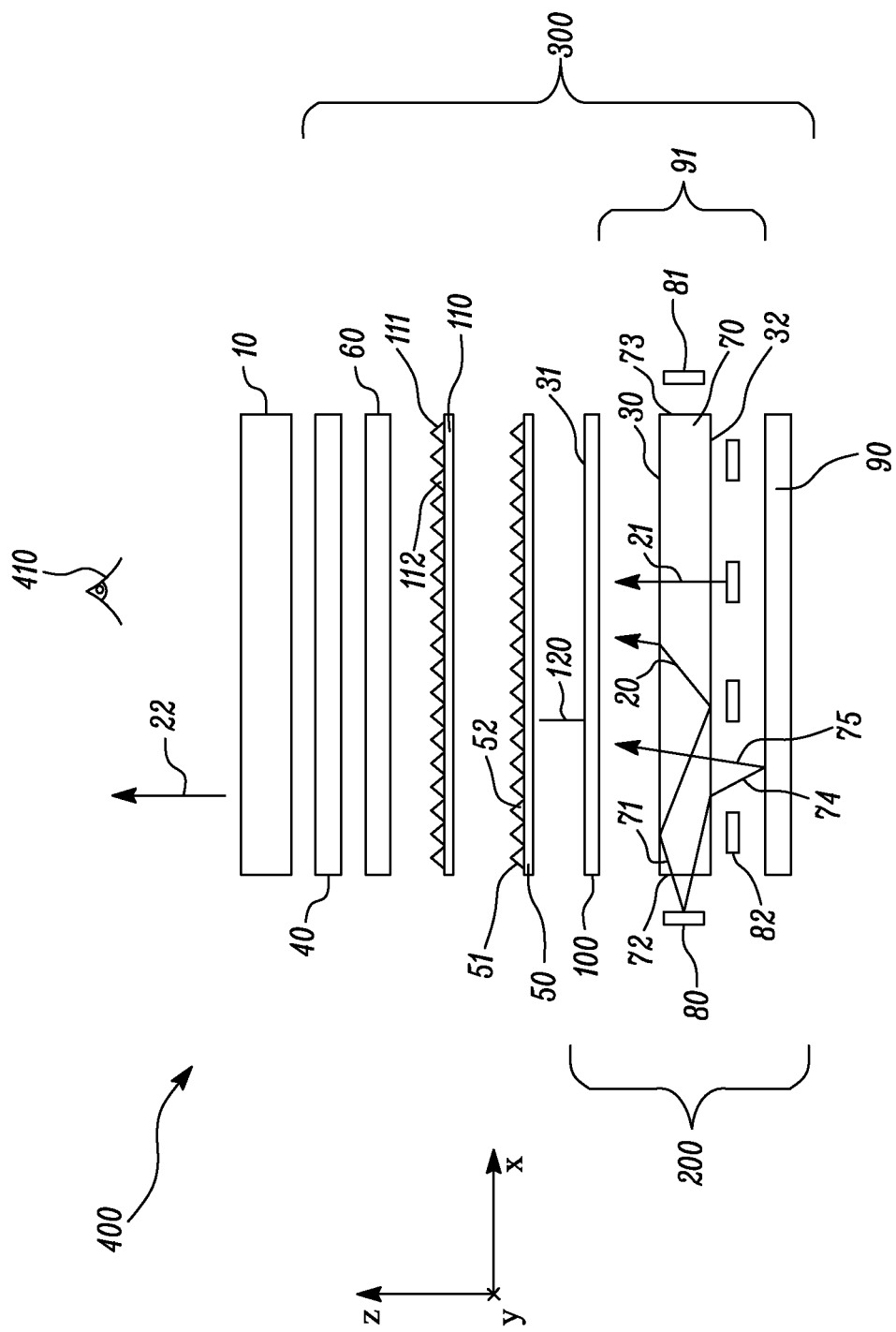
FIG. 1 is a schematic view of a display according to one embodiment of the present disclosure.

Referring now to the Figures, FIG. 1 illustrates a display 400 including a liquid crystal panel 10 and a backlight 300. The liquid crystal panel 10 is disposed on and receives illumination from the backlight 300. The backlight 300 for providing illumination to the liquid crystal panel 10 includes an extended light source 200, a reflective polarizer 40, a first prismatic film 50, and a retarder layer 60. In some embodiments, the reflective polarizer 40, the extended light source 200, the first prismatic film 50, and the retarder layer 60 are substantially co-extensive with each other.

The display 400 defines mutually orthogonal x, y and z-axes. The x and y-axes are in-plane axes of the display 400, while the z-axis is a transverse axis disposed along a thickness of the display 400. In other words, the x-axes and y-axes are disposed along a plane of the display 400, while the z-axis is perpendicular to the plane of the display 400. The liquid crystal panel 10, the extended light source 200, the reflective polarizer 40, the first prismatic film 50, and the retarder layer 60 of the display 400 are disposed adjacent to each other along the z-axis.

The extended light source 200 is adapted to emit light 20, 21 through an emission surface 30, 31 thereof. In some embodiments, the extended light source 200 includes a lightguide 70 for propagating light 71 therein along a length and a width of the lightguide 70. The length of the lightguide 70 is defined along the x-axis, while the width of the lightguide 70 is defined along the y-axis. The lightguide 70 faces the liquid crystal panel 10 and includes the emission surface 30. The lightguide 70 includes a pair of opposing edge surfaces 72, 73 spaced apart from each other relative to the x-axis. The lightguide 70 may be made of an optically transparent material. Further, the lightguide 70 may be a plate having multiple structures for guiding light 71.

In some embodiments, the extended light source 200 further includes at least one light source 80, 81 disposed proximate the edge surfaces 72, 73 of the lightguide 70. The at least one light source 80 generates light 71, 74 that illuminates the display 400. In some embodiments, the at least one light source 80, 81 includes one or more light emitters which emit light. The light emitters may be, for example, light emitting diodes (LEDs), fluorescent lights, or any other suitable light emitting devices. The LEDs may be monochromatic, or may include a number of emitters operating at different wavelengths in order to produce a white light output.

In the illustrated embodiment of FIG. 1, the display 400 includes a first set of light sources 80, 81 and a second set of light sources 82. The first set of light sources 80, 81 are located proximate the respective edge surfaces 72, 73 of the lightguide 70. Specifically, the first set of light sources 80 is located proximate the edge surface 72 of the lightguide 70, while the first set of light sources 81 is located proximate the edge surface 73 of the lightguide 70. Further, the second set of light sources 82 is located proximate a bottom side 32 of the lightguide 70 opposite to the emission surface 30. In some other embodiments, only one of the first set of light sources 80, 81 and the second set of light sources 82 may be present. The first set of light sources 80, 81 emit light 20, 75, while the second set of light sources 82 emit light 21 through the lightguide 70.

Light 21 from the second set of light sources 82 propagates through the lightguide 70 towards the liquid crystal panel 10. The lightguide 70 further guides light 71 from the first set of light sources 80 and directs light 20 towards the liquid crystal panel 10. In some embodiments, the lightguide 70 may use total internal reflection (TIR) to transport or guide light 71 from the first set of light sources 80 located proximate the edge surface 72 towards the liquid crystal panel 10. In some cases, the lightguide 70 may improve uniformity of light 22 emitted by the display 400.

The extended light source 200 further includes a reflecting layer 90 facing the bottom side 32 of the lightguide 70 away from the emission surface 30. The reflecting layer 90 is configured to reflect light 74 that exits the lightguide 70 toward the reflecting layer back toward the lightguide 70. Light 74 is emitted by the first set of light sources 80. Reflected light 75 from the reflecting layer 90 propagates toward the emission surface 30. In some embodiments, the reflecting layer 90 may also be useful for recycling light within the display 400. The reflecting layer 90 may be a specular reflector or a diffuse reflector. In some embodiments, the reflecting layer 90 may be an Enhanced Diffuse Reflector (EDR) film produced by the 3M Company. In some embodiments, the reflective properties of the reflecting layer 90 can be described by the bidirectional reflectivity distribution functions (BRDF). The BRDF describes the radiance reflected into every inward direction for unit radiance incident in any outward direction. The reflecting layer 90 may have a reflectivity for normally incident light of any polarization of at least 80%, at least 90%, at least 95%, at least 98%, or at least 99%. The reflecting layer 90 may include a reflecting surface (e.g., a metallic surface) or may have a multi-layer configuration. In some embodiments, the reflecting layer 90 has an average diffuse reflectance (RD) and an average specular reflectance (RS). In some embodiments, for substantially normally incident light in a visible wavelength range from about 420 nanometer (nm) to about 680 nm, the reflecting layer 90 has RS>RD>10%.

In some embodiments, the extended light source 200 includes a first optically diffusive layer 100 for scattering light. The first optically diffusive layer 100 faces the liquid crystal panel 10 and includes the emission surface 31. The first optically diffusive layer 100 may be used to diffuse light 20, 21, 75 received from the light sources 80, 82. This may increase a uniformity of illumination light incident on the liquid crystal panel 10. Consequently, this may result in an image perceived by a viewer 410 to be uniformly bright. In some embodiments, the first optically diffusive layer 100 may include an adhesive layer.

In some embodiments, the first optically diffusive layer 100 is substantially polarization preserving. In some embodiments, for normally incident light having a predetermined polarization state, the first optically diffusive layer 100 transmits the incident light with at least 70% of the transmitted light having the predetermined polarization state. In some embodiments, for normally incident light having a predetermined polarization state, the first optically diffusive layer 100 transmits the incident light with at least 80%, at least 90%, at least 95%, or at least 98% of the transmitted light having the predetermined polarization state.

The first optically diffusive layer 100 may be an optional component. In case the first optically diffusive layer 100 is not present, the lightguide 70 includes the emission surface 31 of the extended light source 200.

The extended light source 200 includes the reflecting layer 90 facing the first optically diffusive layer 100 and defining an optical cavity 91 therebetween. In some embodiments, the at least one light source 82 is disposed in the optical cavity 91. In other words, the optical cavity 91 is an enclosure designed to contain the at least one light source 82 and direct light 21 from the at least one light source 82 toward the liquid crystal panel 10. In some embodiments, the optical cavity 91 may be made separately by molding, embossing, casting or electroforming. In the illustrated embodiment of FIG. 1, the light sources 80, 81 are disposed proximate the respective edge surfaces 72, 73 of the lightguide 70, while the light sources 82 are disposed in the optical cavity 91.

The reflective polarizer 40 is disposed on the extended light source 200, such that for substantially normally incident light 41 (shown in FIGS. 2A and 2B) and for at least a first wavelength in a range from about 420 nm to about 650 nm, the reflective polarizer 40 reflects at least 60% of the incident light having a first polarization state and transmits at least 60% of the incident light having an orthogonal second polarization state. In some embodiments, the at least a first wavelength includes each wavelength in the range from about 420 nm to about 650 nm.

In some embodiments, the first polarization state is defined along the x-axis, while the second polarization state is defined along the y-axis. In some other embodiments, the first polarization state is defined along the y-axis, while the second polarization state is defined along the x-axis. In some embodiments, the first polarization state is S polarization state and the second polarization state is P polarization state. In some other embodiments, the first polarization state is P polarization state and the second polarization state is S polarization state.

The first prismatic film 50 is disposed between the extended light source 200 and the reflective polarizer 40. The first prismatic film 50 includes a structured major surface 51. The structured major surface 51 includes a plurality of substantially parallel first linear prisms 52 extending along a first direction and arranged in an orthogonal second direction. In some embodiments, the first direction is defined along the x-axis, while the second direction is defined along the y-axis. In some other embodiments, the first direction is defined along the y-axis, while the second direction is defined along the x-axis. The first linear prisms 52 face away from the emission surfaces 30, 31 of the extended light source 200.

In some embodiments, the backlight 300 further includes a second prismatic film 110 disposed between the first prismatic film 50 and the reflective polarizer 40. The second prismatic film 110 includes a structured major surface 111. The structured major surface 111 includes a plurality of substantially parallel first linear prisms 112 extending along the second direction and arranged in the first direction. The second linear prisms 112 face away from the first prismatic film 50.

In general, a moiré effect may be observed as an interference phenomenon when two similar lattices are overlapped. The moiré effect may result from the interference among two or more regular structures having different intrinsic frequencies. The combination of the reflective polarizer 40 and the one or more prismatic films 50, 110 may lead to the appearance of alternating dark and bright bands to the viewer 410. Such an optical artifact is referred to as reflective polarizer reflective moiré (RPRM). It may therefore be desirable to eliminate or mitigate RPRM. To prevent RPRM, the retarder layer 60 is disposed between the reflective polarizer 40 and the one or more prismatic films 50, 110.

The retarder layer 60 is disposed between the reflective polarizer 40 and the first prismatic film 50 such that for substantially normally incident light 61 (shown in FIG. 4) at a wavelength of about 550 nm, the retarder layer 60 has a retardance nW, where n is an integer ≥1, and W is between about 160 nm and about 300 nm. In some embodiments, n is 1. In some other embodiments, n is 2.

The RPRM may be mitigated by optimization of the polarization state of the incident light 41 reflected by the reflective polarizer 40 through controlled or tuned retardance nW. In some embodiments, the retarder layer 60 may be an achromatic retarder layer.

The achromatic retarder layer may be configured to convert, rotate or modulate polarization substantially independent of the wavelength of incident light. The achromatic retarder layer may therefore minimize or eliminate shifts in color or other artifacts. In some embodiments, the desired achromaticity may be achieved through designing or selecting certain wavelength-specific retardance. In some embodiments, the retarder layer 60 may be a half-wave achromatic retarder layer or a quarter wave retarder layer.

Generally, Commission on Illumination (CIE) 1931 chromaticity coordinate system is a convenient tool or standard used to characterize and quantify perceived colors. The color (or "chromaticity" or "chromaticity coordinates") of a light source or an article can be precisely measured or specified by a point or region expressed in terms of one or more chromaticity coordinates (x, y) on a CIE chromaticity diagram, using the CIE 1931 chromaticity coordinate system. For a color display, a set of all possible colors the display can generate is represented by a region, zone, or an area on the chromaticity diagram referred to as the "color gamut" of the display. For a tri-color based display (i.e., a display that uses exactly three distinct subpixel colors, e.g., red, green, and blue), the color gamut is triangle-shaped, with each corner of the triangle corresponding to the perceived display color when only one of the subpixel colors is "on". The color gamuts of different displays can be compared by comparing their respective areas on the chromaticity diagram.

In some embodiments, light emitted by the backlight 300 at zero degree and at sixty degrees with respect to a line 120 normal to the emission surface 31 has respective color coordinates (x1, y1) and (x2, y2) in CIE 1931 chromaticity coordinate system in a white region. x1 and x2 are called as abscissa, and y1 and y2 are called as ordinates in the coordinate system. In some other embodiments, x1 and x2 (shown in FIG. 7) are different by less than about 0.0051. In some other embodiments, x1 and x2 are different by less than about 0.0055, less than about 0.006, or less than about 0.0065. In some embodiments, y1 and y2 (shown in FIG. 6) are different by less than about 0.01. In some other embodiments, y1 and y2 are different by less than about 0.015, less than about 0.02, or less than about 0.03.

In some embodiments, the reflective polarizer 40, the emission surface 30, 31 of the extended light source 200, the first prismatic film 50, and the retarder layer 60 are substantially co-extensive with each other.

In some embodiments, the reflective polarizer 40, the emission surfaces 30, 31 of the extended light source 200, the first optically diffusive layer 100, the first prismatic film 50, the second prismatic film 110, and the retarder layer 60 are substantially co-extensive with each other.

The display 400 includes the liquid crystal panel 10 configured to selectively transmit and reflect light 21, 20, 75 received from the emission surfaces 30, 31 of the extended light source 200. The liquid crystal panel 10 is disposed on the backlight 300. In some embodiments, the liquid crystal panel 10 and the backlight 300 are bonded together, for example, by means of an optical adhesive, epoxy, lamination, or any other suitable method of attachment.

Figure 2B:
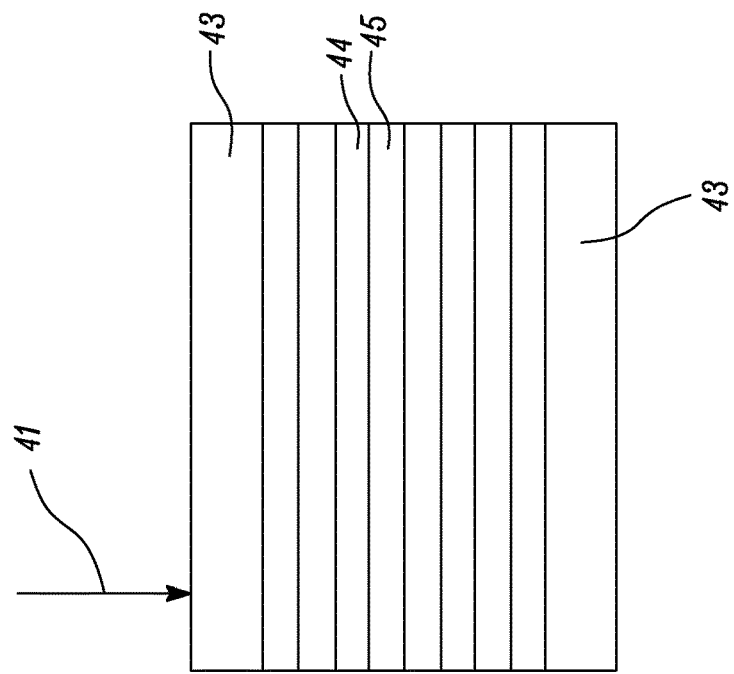
FIG. 2B is a detailed schematic view of the reflective polarizer according to one embodiment of the present disclosure.
Figure 2A:
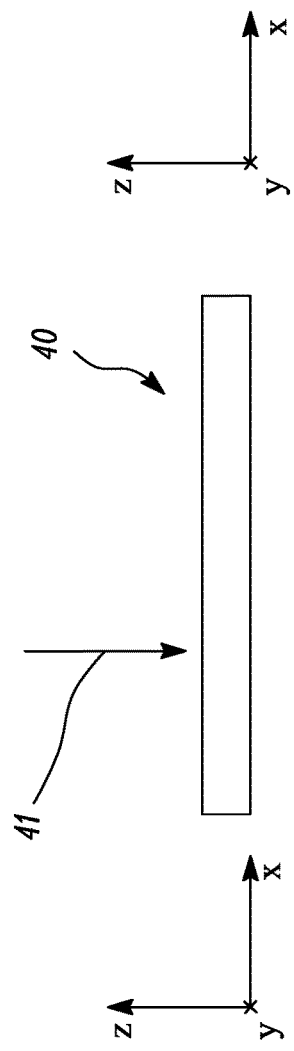
FIG. 2A is a schematic view of a reflective polarizer according to one embodiment of the present disclosure.

FIGS. 2A and 2B illustrate the reflective polarizer 40. The reflective polarizer 40 may include one or more of a polymeric reflective polarizer, a wire grid reflective polarizer, and a diffuse reflective polarizer. In some embodiments, the reflective polarizer 40 is a linear reflective polarizer. In some other embodiments, the reflective polarizer 40 may be a circular reflective polarizer.

The reflective polarizer 40 includes a plurality of alternating first and second layers 44, 45. In some embodiments, each layer 44, 45 may be less than about 500 nm thick. In some other embodiments, each layer 44, 45 may be less than about 550 nm thick, less than about 600 nm thick, or less than about 700 nm thick. In some embodiments, the second layers 45 have a lower index of refraction than the first layers 44. The reflective polarizer 40 includes a protective layer 43 disposed on each major side of the plurality of alternating first and second layers 44, 45. The reflective polarizer 40 reflects at least 60% of the incident light 41 having the first polarization state and transmits at least 60% of the incident light 41 having an orthogonal second polarization state. The first polarization state is defined along the x-axis, while the second polarization state is defined along the y-axis. In some embodiments, the first polarization state is S polarization state and the second polarization state is P polarization state. In some other embodiments, the first polarization state is P polarization state and the second polarization state is S polarization state. A pass axis of the reflective polarizer 40 may correspond to the second polarization state, while an orthogonal block axis of the reflective polarizer 40 may correspond to the first polarization state.

Figure 3:
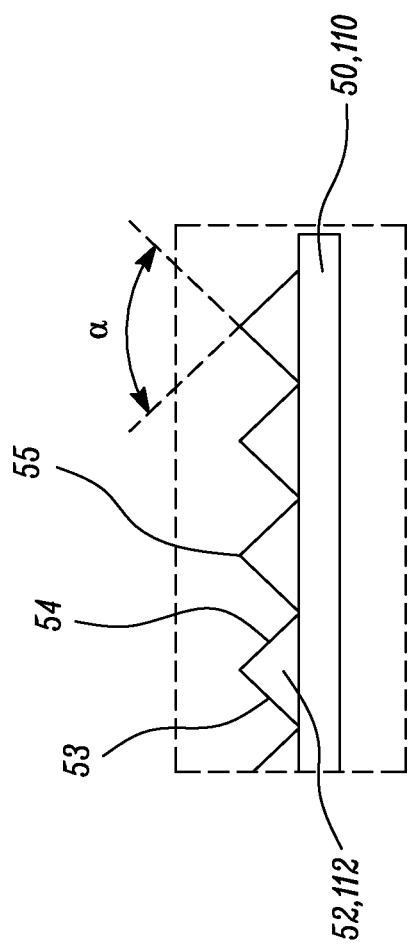
FIG. 3 is a schematic view of a prismatic film according to one embodiment of the present disclosure.

FIG. 3 illustrates a prismatic film according to an embodiment of the disclosure. The prismatic film may be any one of the first prismatic film 50 and the second prismatic film 110. The first prismatic film 50 includes the first linear prisms 52 and the second prismatic film 110 includes the second linear prisms 112. Each of the first linear prism 52 and the second linear prism 112 includes opposing side surfaces 53, 54 meeting at a peak 55. In some embodiments, an angle α between the opposing side surfaces 53, 54 is between about 70 degrees to about 110 degrees. In some embodiments, the angle α between the opposing side surfaces 53, 54 may be between about 50 degrees to about 120 degrees. In some embodiments, the angle α may vary as per desired application attributes.

Referring to FIGS. 1 and 3, due to inclusion of the one or more prismatic films 50, 110, light 20, 21, 75 emitted by the one or more light sources 80, 82 can appropriately be reflected and refracted so that an angular distribution of light exiting the liquid crystal panel 10 can be decreased and brightness of light exiting the liquid crystal panel can be enhanced. In other words, the first and second prismatic films 50, 110 may redirect off-axis light in a direction closer to the axis of the display 400. Therefore, the first and second prismatic films 50, 110 may enhance a brightness of an image emitted by the display 400.

The first and second prismatic films 50, 110 may be one of the films manufactured by the 3M Company under the trade name BEF, as in brightness enhancement film. In some embodiments, each of the first and second prismatic films 50, 110 may also be a custom designed prism array molded, embossed or cast in an optically transparent material, such as acrylic, polyester or polycarbonate.

Light refracted by the one or more prismatic films 50, 110 is substantially transmitted by the reflective polarizer 40, if the polarization of the refracted light is along the pass axis of the reflective polarizer 40. Light refracted by the one or more prism films 50, 110 that has polarization along the orthogonal block axis is blocked or reflected by the reflective polarizer 40 back to the extended light source 200.

In some embodiments, the first and second prismatic films 50, 110 may collectively referred to as a "crossed prismatic film". In this embodiment, the first and second prismatic films 50, 110 are arranged such that the first and second prismatic films 50, 110 are rotated 90 degrees relative to one another.

Figure 4:
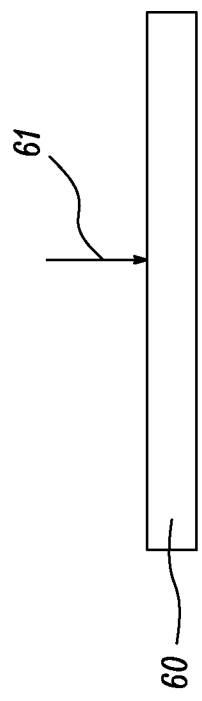
FIG. 4 is a schematic view of a retarder layer according to one embodiment of the present disclosure.

FIG. 4 illustrates the retarder layer 60. In some embodiments, for substantially normal incident light 61 at a wavelength of about 550 nm, the retarder layer 60 has the retardance nW, where n is an integer, and W is between about 160 nm and about 300 nm. The retarder layer 60 may reduce several light recycling sequences by appropriately converting the polarization of reflected light from the reflective polarizer 40 into the polarization that can be substantially transmitted by the reflective polarizer 40. In other words, the retarder layer 60 may convert the polarization of reflected light into the polarization along the pass-axis of the reflective polarizer 40.

Figure 5:
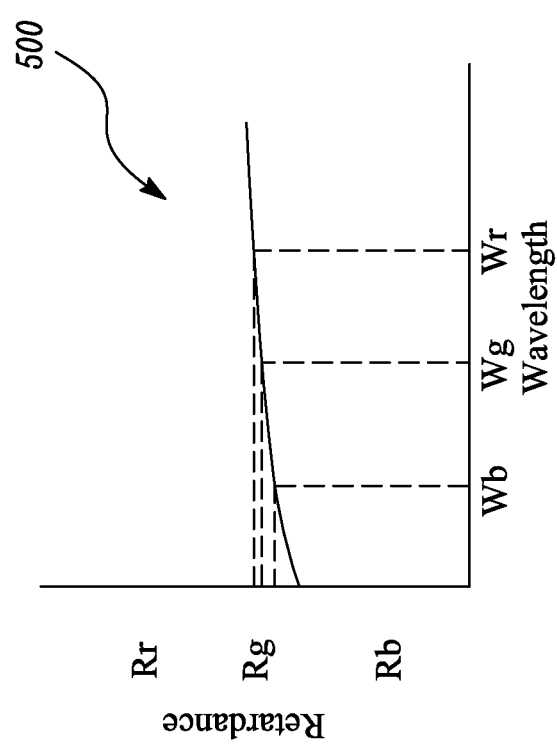
FIG. 5 is a graph illustrating a variation of a retardance of the retarder layer with a wavelength of incident light.

FIG. 5 illustrates a graph 500 depicting a variation of a retardance of the retarder layer 60 (shown in FIG. 4) with a wavelength of incident light. In some embodiments, the retarder layer 60 is an achromatic retarder layer. In some embodiments, the retarder layer 60 may be interchangeably referred to as the achromatic retarder layer 60.

The achromatic retarder layer 60 has a minimum blue retardance Rb at a corresponding blue wavelength Wb, a minimum green retardance Rg at a corresponding green wavelength Wg, and a minimum red retardance Rr at a corresponding red wavelength Wr. The minimum blue, green, and red retardances are within 20% of each other. In some other embodiments, the minimum blue, green, and red retardances are within 10% of each other. It may be apparent from the graph 500 that the retardance of the achromatic retarder layer 60 does not vary considerably with the wavelength of incident light.

The achromatic retarder layer 60 may be configured to convert, rotate or modulate polarization substantially independent of the wavelength of incident light. The achromatic retarder layer 60 may therefore minimize or eliminate shifts in color or other artifacts. In some embodiments, the desired achromaticity may be achieved through designing or selecting certain wavelength-specific retardance. In some embodiments, the achromatic retarder layer 60 may be a half-wave achromatic retarder layer or a quarter wave retarder layer. Additionally, the achromatic retarder layer 60 may also eliminate or mitigate the RPRM through tuned retardation.

Figure 6:
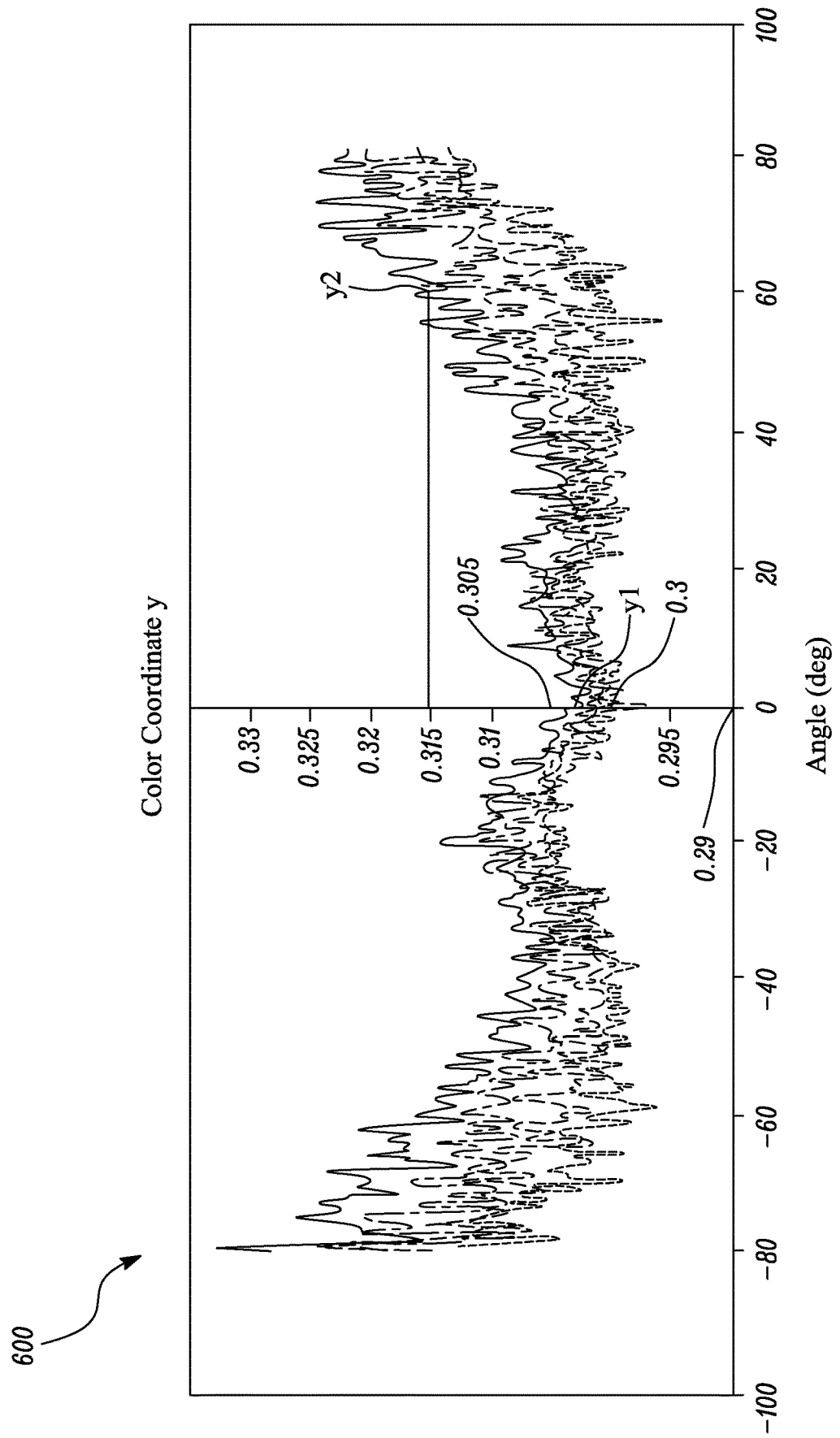
FIG. 6 is a graph illustrating an angular variation of a color coordinate y.

FIG. 6 is a graph 600 illustrating a variation of the color coordinate y with an angle between light emitted by the backlight 300 (shown in FIG. 1) and the line 120 normal to the emission surface 30, 31. Each curve in the graph corresponds to a different color and wavelength of light, for example, red, blue, green, etc. It may be apparent from the graph 600 that the color coordinate y exhibits a low variation for different angles and colors. For example, the variation of the color coordinate y1 at zero degree and the color coordinate y2 at sixty degrees is less than about 0.01 for a given wavelength of light.

Figure 7:
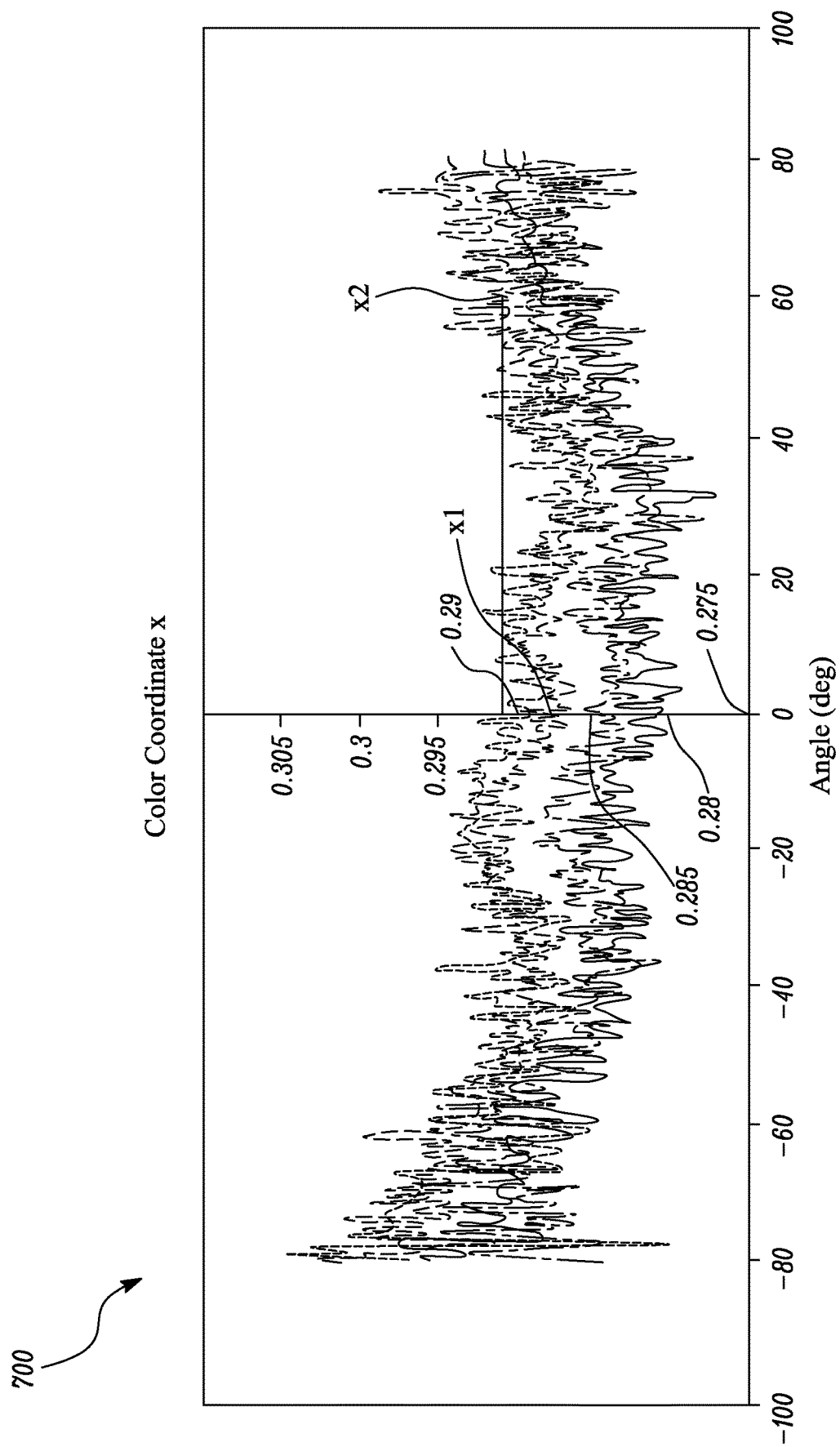
FIG. 7 is a graph illustrating an angular variation of a color coordinate x.

FIG. 7 is a graph 700 illustrating a variation of the color coordinate x with the angle between light emitted by the backlight 300 (shown in FIG. 1) and the line 120 normal to the emission surface 30, 31. Each curve in the graph corresponds to a different color and wavelength of light, for example, red, blue, green, etc. It may be apparent from the graph 700 that the color coordinate x exhibits a low variation for different angles and colors. For example, the variation of the color coordinate x1 at zero degree and the color coordinate x2 at sixty degrees is less than about 0.0051 for a given wavelength of light.

Low angular variations of the color coordinates x and y for different wavelengths of light may correspond to low RPRM perceived by the viewer 410. The retarder layer 60 may mitigate RPRM by providing tuned retardance to light reflected by the reflective polarizer 40.

Unless otherwise indicated, all numbers expressing feature sizes, amounts, and physical properties used in the specification and claims are to be understood as being modified by the term "about". Accordingly, unless indicated to the contrary, the numerical parameters set forth in the foregoing specification and attached claims are approximations that can vary depending upon the desired properties sought to be obtained by those skilled in the art utilizing the teachings disclosed herein.

Although specific embodiments have been illustrated and described herein, it will be appreciated by those of ordinary skill in the art that a variety of alternate and/or equivalent implementations can be substituted for the specific embodiments shown and described without departing from the scope of the present disclosure. This application is intended to cover any adaptations or variations of the specific embodiments discussed herein. Therefore, it is intended that this disclosure be limited only by the claims and the equivalents thereof.

The invention claimed is:

1. A backlight for providing illumination to a liquid crystal panel, comprising:
an extended light source adapted to emit light through an emission surface thereof;
a reflective polarizer disposed on the extended light source, such that for substantially normally incident light and for at least a first wavelength in a range from about 420 nm to about 650 nm, the reflective polarizer reflects at least 60% of the incident light having a first polarization state and transmits at least 60% of the incident light having an orthogonal second polarization state;
a first prismatic film disposed between the extended light source and the reflective polarizer and comprising a structured major surface comprising a plurality of substantially parallel first linear prisms extending along a first direction and arranged in an orthogonal second direction; and
a retarder layer disposed between the reflective polarizer and the first prismatic film, such that for substantially normally incident light at a wavelength of about 550 nm, the retarder layer has a retardance nW, where n is an integer ≥1 and W is between about 160 nm and about 300 nm, wherein light emitted by the backlight at zero and sixty degrees with respect to a line normal to the emission surface has respective color coordinates (x1, y1) and (x2, y2) in CIE 1931 chromaticity coordinate system in a white region, wherein x1 and x2 are different by less than about 0.0051, and y1 and y2 are different by less than about 0.01.

2. The backlight of claim 1, wherein the extended light source comprises:
a lightguide for propagating light therein along a length and a width of the lightguide, the lightguide comprising the emission surface;
at least one light source disposed proximate an edge surface of the lightguide; and
a reflecting layer facing a bottom side of the lightguide away from the emission surface and configured to reflect light that exits the lightguide toward the reflecting layer back toward the lightguide, the reflected light propagating toward the emission surface.

3. The backlight of claim 1, wherein the extended light source comprises:
a first optically diffusive layer for scattering light, the first optically diffusive layer comprising the emission surface;
a reflecting layer facing the first optically diffusive layer and defining an optical cavity therebetween; and
at least one light source disposed in the optical cavity.

4. The backlight of claim 1, wherein the at least a first wavelength comprises each wavelength in the range from about 420 nm to about 650 nm.

5. The backlight of claim 1, wherein the first linear prisms face away from the emission surface of the extended light source.

6. The backlight of claim 1, wherein the reflective polarizer, the emission surface of the extended light source, the first prismatic film, and the retarder layer are substantially co-extensive with each other.

7. The backlight of claim 1, wherein each first linear prism comprises opposing side surfaces meeting at a peak, and wherein an angle between the opposing side surfaces is between about 70 degrees to about 110 degrees.

8. The backlight of claim 1 further comprising a second prismatic film disposed between the first prismatic film and the reflective polarizer and comprising a structured major surface comprising a plurality of substantially parallel second linear prisms extending along the second direction and arranged the first direction, wherein each second linear prism comprises opposing side surfaces meeting at a peak, wherein an angle between the opposing side surfaces is between about 70 degrees to about 110 degrees, and wherein the second linear prisms face away from the first prismatic film.

9. The backlight of claim 1, wherein n is 1.

10. The backlight of claim 1, wherein n is 2.

11. A display comprising a liquid crystal panel disposed on, and receiving illumination from, the backlight of claim 1.

12. A backlight for providing illumination to a liquid crystal panel, comprising:
an extended light source adapted to emit light through an emission surface thereof;
a reflective polarizer disposed on the extended light source, such that for substantially normally incident light and for at least a first wavelength in a range from about 420 nm to about 650 nm, the reflective polarizer reflects at least 60% of the incident light having a first polarization state and transmits at least 60% of the incident light having an orthogonal second polarization state;
a first prismatic film disposed between the extended light source and the reflective polarizer and comprising a structured major surface comprising a plurality of substantially parallel first linear prisms extending along a first direction and arranged in an orthogonal second direction; and an achromatic retarder layer disposed between the reflective polarizer and the first prismatic film, such that for substantially normally incident light, the retarder layer has a minimum blue retardance at a corresponding blue wavelength, a minimum green retardance at a corresponding green wavelength, and a minimum red retardance at a corresponding red wavelength, wherein the minimum blue, green and red retardances are within 20% of each other wherein light emitted by the backlight at zero and sixty degrees with respect to a line normal to the emission surface has respective color coordinates (x1, y1) and (x2, y2) in CIE 1931 chromaticity coordinate system in a white region, wherein x1 and x2 are different by less than about 0.0051, and y1 and y2 are different by less than about 0.01.

13. The backlight of claim 12, wherein the minimum blue, green and red retardances are within 10% of each other.

14. The backlight of claim 12 further comprising a second prismatic film disposed between the first prismatic film and the reflective polarizer and comprising a structured major surface comprising a plurality of substantially parallel second linear prisms extending along the second direction and arranged the first direction.

15. The backlight of claim 12, wherein the reflective polarizer comprises a plurality of alternating first and second layers, each of the first and second layers less than about 500 nm thick, the second layers having a lower index of refraction than the first layers.

16. The backlight of claim 15, wherein the reflective polarizer further comprises a protective layer disposed on each major side of the plurality of the alternating first and second layers.

* * * * *

UNITED STATES PATENT AND TRADEMARK OFFICE
CERTIFICATE OF CORRECTION

PATENT NO. : 11,921,373 B2
APPLICATION NO. : 17/797480
DATED : March 5, 2024
INVENTOR(S) : Kristy Ann Gillette et al.

Page 1 of 1

It is certified that error appears in the above-identified patent and that said Letters Patent is hereby corrected as shown below:

In the Claims

Column 10
Line 43, In Claim 8, delete "arrange the first direction", and insert -- arranged in the first direction --, therefor.

Column 11
Line 13, In Claim 12, insert --,--, between "each other" and "wherein".

Column 12
Line 8, In Claim 14, delete "arrange the first direction", and insert -- arranged in the first direction --, therefor.

Signed and Sealed this
Sixth Day of August, 2024

Katherine Kelly Vidal
*Director of the United States Patent and Trademark Office*